US006898623B1

(12) United States Patent
Williams et al.

(10) Patent No.: US 6,898,623 B1
(45) Date of Patent: May 24, 2005

(54) SIMPLIFIED CONFIGURATION OF AN INTERNET-ENABLED DEVICE

(75) Inventors: Irene H Williams, St Escondido, CA (US); William Sheridan Brock, Lemon Grove, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 902 days.

(21) Appl. No.: 09/595,501

(22) Filed: Jun. 16, 2000

(51) Int. Cl.[7] .............................................. G06F 15/16
(52) U.S. Cl. ....................... 709/206; 709/228; 709/245
(58) Field of Search ................................ 709/206, 245, 709/227, 228, 243; 379/93.24

(56) References Cited

U.S. PATENT DOCUMENTS

| | | | |
|---|---|---|---|
| 4,902,881 A | | 2/1990 | Janku |
| 4,941,180 A | | 7/1990 | Buettner |
| 5,819,110 A | | 10/1998 | Motoyama |
| 5,862,202 A | | 1/1999 | Bashoura et al. |
| 5,881,233 A | | 3/1999 | Toyoda et al. |
| 5,920,404 A | | 7/1999 | Weiser |
| 5,987,508 A | * | 11/1999 | Agraharam et al. ........ 709/217 |
| 5,991,052 A | | 11/1999 | Hobo |
| 6,005,677 A | | 12/1999 | Suzuki |
| 6,016,512 A | * | 1/2000 | Huitema ..................... 709/245 |
| 6,020,980 A | | 2/2000 | Freeman |
| 6,023,345 A | | 2/2000 | Bloomfield |
| 6,023,700 A | | 2/2000 | Owens et al. |
| 6,025,931 A | | 2/2000 | Bloomfield |
| 6,026,441 A | * | 2/2000 | Ronen ....................... 709/227 |
| 6,031,637 A | | 2/2000 | Shibata et al. |
| 6,138,146 A | * | 10/2000 | Moon et al. ................ 709/206 |
| 6,381,634 B1 | * | 4/2002 | Tello et al. ................. 709/206 |
| 6,449,657 B2 | * | 9/2002 | Stanbach et al. ........... 709/245 |
| 6,457,060 B1 | * | 9/2002 | Martin et al. .............. 709/245 |
| 6,463,464 B1 | * | 10/2002 | Lazaridis et al. ........... 709/207 |
| 6,525,768 B2 | * | 2/2003 | Obradovich ........... 348/231.99 |
| 6,574,670 B1 | * | 6/2003 | Eguchi ....................... 709/245 |
| 6,654,789 B1 | * | 11/2003 | Bliss et al. ................. 709/206 |
| 6,708,206 B1 | * | 3/2004 | Thrane et al. .............. 709/219 |

FOREIGN PATENT DOCUMENTS

| | | |
|---|---|---|
| EP | 0270604 | 5/1991 |
| EP | 0615368 | 9/1994 |
| EP | 0692906 | 1/1996 |
| EP | 0465011 | 11/1996 |
| EP | 0746141 | 12/1996 |

(Continued)

OTHER PUBLICATIONS

Shimamura et al., "A Domain Cluster Interface for WWW search", Computer Human Interaction, 1998, Proceedings, 3rd Asia Pacific, Jul. 15–17, 1998, pp: 318–323.*

*Primary Examiner*—Jack B. Harvey
*Assistant Examiner*—Douglas Blair

(57) ABSTRACT

A system and method for configuring an Internet-enabled device to communicate with an unknown mail server so as to allow the device to send information as e-mail messages over the Internet using the resources of an Internet service provider (ISP). Such devices include scanners, multifunction peripherals, and digital cameras. A configuror program uses predetermined access parameters for the ISP to simplify the configuration of the device. From an e-mail address specified by the user during configuration, the configuror determines the mail server name that the device will use to send e-mail, and downloads the address, along with a portion of the access parameters and a maximum e-mail message size, to the device. After configuration, the device can directly connect to the ISP and send e-mail in a stand-alone manner. If the device is connected to a computer following installation, computer can update the device for any changes in ISP access, and the device can send e-mail messages through the computer rather than directly so as to avoid more than one simultaneous connection to the ISP.

19 Claims, 13 Drawing Sheets

FOREIGN PATENT DOCUMENTS

| | | |
|---|---|---|
| EP | 0835011 | 4/1998 |
| EP | 0837597 | 4/1998 |
| EP | 0845894 | 6/1998 |
| EP | 0646857 | 12/1998 |
| EP | 0895390 | 2/1999 |
| EP | 0893897 | 3/1999 |
| EP | 1043887 A1 | 3/1999 |
| EP | 0923227 | 6/1999 |
| EP | 1041778 A2 | 9/1999 |
| EP | 0971527 | 1/2000 |
| WO | WO95/15644 | 6/1995 |
| WO | WO96/34341 | 10/1996 |
| WO | WO97/10668 | 3/1997 |
| WO | WO97/18665 | 5/1997 |
| WO | WO97/23088 | 6/1997 |
| WO | WO97/41463 | 11/1997 |
| WO | WO97/49251 | 12/1997 |
| WO | WO98/17041 | 4/1998 |
| WO | WO98/19478 | 5/1998 |
| WO | WO98/23058 | 5/1998 |
| WO | WO98/33413 | 8/1998 |
| WO | WO98/53603 | 11/1998 |
| WO | WO99/40527 | 2/1999 |
| WO | WO99/24926 | 5/1999 |
| WO | WO9952270 | 10/1999 |
| WO | WO99/53657 | 10/1999 |
| WO | WO99/56459 | 11/1999 |
| WO | WO99/56460 | 11/1999 |
| WO | WO99/57859 | 11/1999 |
| WO | WO99/65216 | 12/1999 |
| WO | WO99/66442 | 12/1999 |

\* cited by examiner

SUBJECT: WELCOME MESSAGE FROM THE HP OFFICEJET ONE-TOUCH EMAIL SETUP
DATE:    THU, 18 MAY 2000 06:48:56 GMT
FROM:    sismilich@ixpres.com
TO:      sismilich@ixpres.com CONGRATULATIONS! YOU SUCCESSFULLY COMPLETED THE HP OFFICEJET ONE-TOUCH EMAIL SETUP MAIL SERVER NAME=smtp.ixpres.com
SERVER E-MAIL ATTACHMENT SIZE=10485760

FIG.10

SIMPLIFIED CONFIGURATION OF AN INTERNET-ENABLED DEVICE

FIELD OF THE INVENTION

The present invention relates generally to communications over the Internet, and pertains more particularly to a simplified manner of configuring an Internet-enabled device with the parameters needed to send e-mail via an unknown mail server.

BACKGROUND OF THE INVENTION

In the recent past, the use of the Internet by businesses and individuals has increased dramatically. This increase has been spurred by, and has in turn driven, a similarly dramatic increase in the number of business and home computers which can connect to the Internet. These phenomena have revolutionized how information can be communicated from person to person. Text, images, and other types of information can now be rapidly transmitted by electronic mail (also known as e-mail) around the world, either from one person to another, or from one person to a number of others.

While word processing software on the computer is often used to create this information, it is not the only source of electronic text and information; a number of other electronic devices that generate text and images have become more widely available over the past few years. These devices include optical scanners, either stand-alone or included as part of a multifunction (scanner/fax/copier/printer) device, which can create an electronic image of the words and graphics on the paper or other media that is scanned. Such devices also include digital cameras which are capable of taking electronic photographs and can be connected to a computer or directly to a multifunction device for faxing, copying, or printing purposes.

Scanners, multifunction devices, and digital cameras are usually connected to the computer, which is used to store the electronic information these devices generate, and gives the user the option of sending the electronic information to others by incorporating it in e-mail messages. E-mail offers many benefits relative to more traditional ways of disseminating information. For example, in comparison to taxing information to only a single user, an e-mail message can be sent to a large distribution list of people. Similarly, digital photographs can be sent to a large audience, each of whom can print the photographs in the size, number, and at the time of their choice. Such users may even manipulate the photographs electronically, such as by cropping the images or adjusting their brightness or color settings.

In any event, before a user can send e-mail regardless of the source of the information, the computer must be properly configured for Internet access. In some situations, configuring the computer requires inputting a large number of arcane parameters peculiar to the computer network using unfamiliar computer utility programs. In other situations, a special configuration software package is supplied by the particular Internet Service Provider (ISP) who provides the Internet connectivity in an attempt to hide some of these complexities from the user. Large corporations often avoid burdening their employees with these complexities by delegating the task of configuring a computer for network access to specially-trained network administrators. Regardless of the approach taken, the configuration process is fraught with a number of potential problems and pitfalls.

Most digital cameras, like most film-based cameras, are relatively small, lightweight, and easily portable. Similarly, small-footprint and hand-held optical scanners are also available. However, requiring a computer as an intermediary to disseminate information via e-mail reduces their portability, adds to their size and bulk, and adds to the cost of an Internet-enabled system. It would be advantageous if there were a way to provide these devices with direct e-mail capability without an attached computer during normal operation. However, properly configuring such an Internet-enabled device would present the same configuration problems discussed previously. In fact, the configuration problem would be worse because scanners and cameras have limited user interfaces to enter and display parameters, and are unlikely to be able to run a computer's configuration software program. Accordingly, it would be highly desirable to have a new and improved Internet-enabled device and configuration method that permits the device to access the Internet for the purpose of sending e-mail communications without the need to be attached to a computer.

SUMMARY OF THE INVENTION

In a preferred embodiment, the present invention provides a stand-alone Internet-enabled electronic device that can directly e-mail information to a recipient over the Internet, and a configuration method that easily configures the device for Internet access with minimum user intervention. The program is run on a computer which is connected to the device during the configuration process, and requires the user to specify merely his e-mail address in order to fully configure the device. Once the device has been configured, it can be disconnected from the computer and operated as a stand-alone device, periodically connecting to an Internet service provider to send information via e-mail as desired.

The configuration program uses the e-mail address to determine the name of the Internet service provider's mail server. The program has a parser to isolate a suffix of the e-mail address, and a concatenator to prepend to the suffix one of a predefined set of mail server prefixes so as to form the mail server name. The program also determines a maximum e-mail message size supported by the e-mail server. The device has a storage subsystem which stores the mail server name, the maximum e-mail message size, and other configuration information it receives from the program in a parameter memory. An e-mail subsystem of the device uses the mail server name and other configuration parameters to connect to the Internet service provider and send information via e-mail. It splits the information into one or more e-mail messages as required, so as to ensure that each e-mail message has a size of not more than the maximum e-mail message size. The device connects to the Internet service provider over an interface such as a dialup modem, a digital subscriber line modem, a cable modem, a network interface, an infrared transceiver, or a radio frequency transceiver.

Another preferred embodiment of the present invention provides a method of communicating with an unknown mail server. The method determines whether a machine-selected mail server name corresponds to a mail server associated with an on-line provider, and if the mail server name does correspond, the method then communicates with that mail server by using the server name. If more than one on-line provider is accessible, the user selects which one should be used. The method performs the determination by converting a provided e-mail address for the on-line provider into a mail server name associated with on-line provider, and then linking to a mail port of a computer having the mail server name in order to verify whether the mail server name corresponds to the mail server associated with the on-line provider. The linking includes communicating with a domain name server to determine a mail server IP address corresponding to the mail server name, and connecting to the mail port of the mail server IP address. The e-mail address includes a suffix portion, to which one of a predetermined set of mail server prefixes preferentially is prepended in order to form the mail server name. Alternatively, the mail server name can be determined from a database using the suffix portion as a key. This database can optionally be downloaded from a remote site accessed through the on-line provider. If this mail server name is not valid, then a different mail server prefix is used to form another mail server name, and the linking is performed again.

Yet another preferred embodiment of the present invention provides a method of configuring an Internet-enabled device, such as a scanner, multifunction peripheral, or digital camera, to send e-mail. The method determines a mail server name associated with the user account of an Internet service provider, and stores the mail server name and selected access parameters to the Internet-enabled device. The mail server name is determined by converting a provided e-mail address associated with the user account to the mail server name, and then accessing a mail server of the Internet service provider corresponding to the mail server name so as to validate the mail server name. Some embodiments of the method include connecting a configuration computer to the user account using the access parameters, and connecting the configuration computer to the Internet-enabled device. Following successful completion, a confirmatory e-mail message may be sent to the provided e-mail address. In some embodiments, a maximum e-mail size is determined by accessing the mail server, and this size parameter is also stored to the Internet-enabled device.

Methods according to the present invention may be embodied as a program storage medium readable by a computer containing a program of executable instructions for configuring the device to send e-mail via a mail server of the Internet service provider. One section of the program converts an e-mail address for a user of the on-line access provider to a mail server name, preferably by prepending one of a predetermined set of common mail server prefixes to the suffix of the e-mail address. Another section of the program connects to the mail server using access information so as to verify validity of the mail server name. Yet another section of the program downloads the mail server name and a predetermined portion of the access information to the device. An alternate embodiment may contain a program section that detects a change in the access information and reconfigures the device as required based on the change. Another alternate embodiment may contain a program section that receives data representing information to be sent to a specified recipient from the device, connects to the mail server, and transmits the information to the specified recipient as an e-mail message.

BRIEF DESCRIPTION OF THE DRAWINGS

The above-mentioned features of the present invention and the manner of attaining them, and the invention itself, will be best understood by reference to the following detailed description of the preferred embodiment of the invention, taken in conjunction with the accompanying drawings, wherein:

FIG. 10 is an exemplary e-mail message sent to the user following successful configuration of the Internet-enabled device according to FIGS. 5A-5C.

DESCRIPTION OF THE PREFERRED EMBODIMENT

Figure 1:
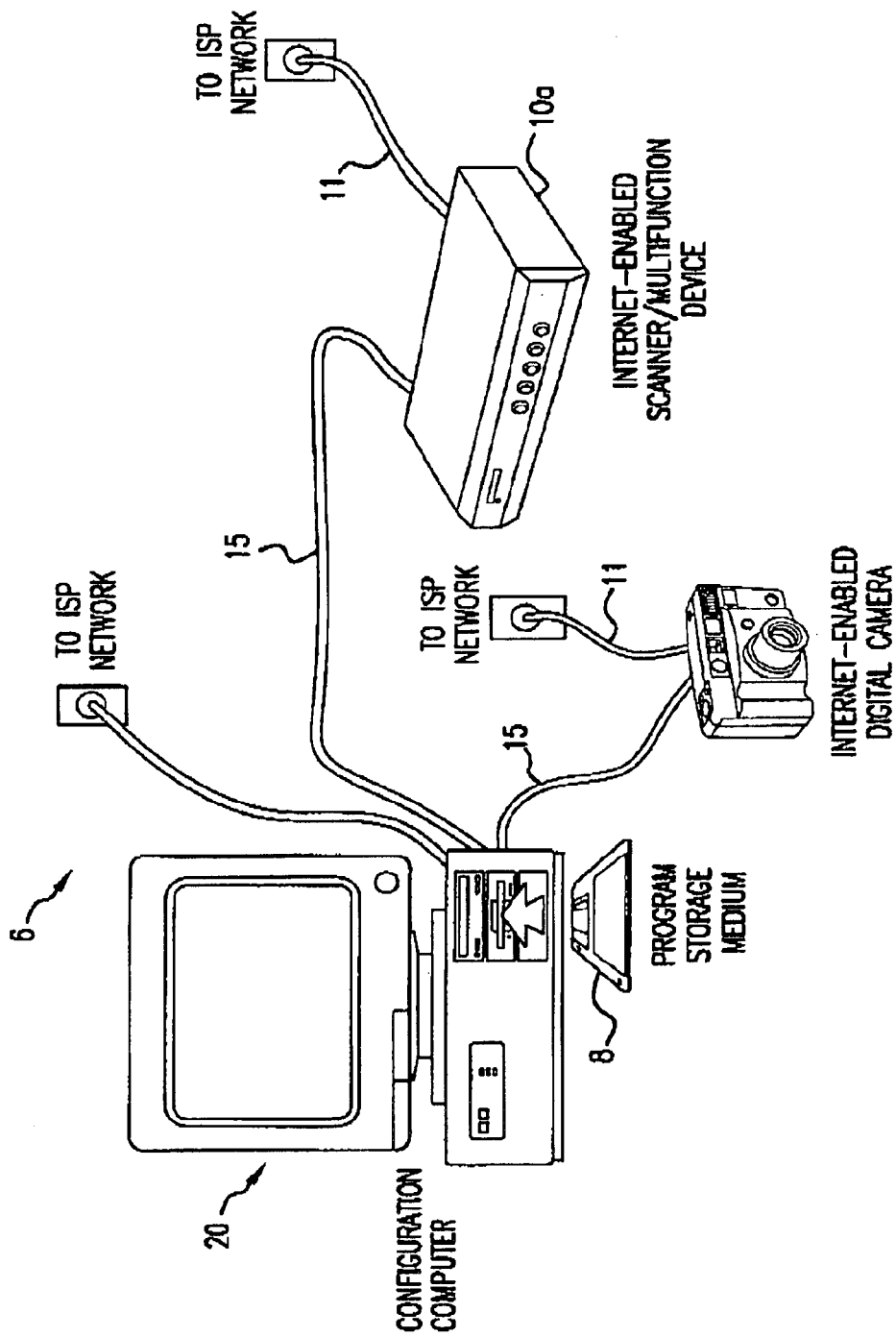
FIG. 1 is a schematic representation of a system for communicating with an unknown mail server in order to send information by e-mail from an Internet-enabled device according to the present invention.

Referring now to the drawings, there is illustrated a novel communication system 6 for sending information to a recipient over the Internet in accordance with a novel method of communicating with an unknown mail server from an Internet-enabled device 10. The system 6 advantageously identifies a mail server 32 associated with an Internet service provider and configures the Internet-enabled device 10 to communicate with the server 32, while requiring the user to supply only a minimal amount of readily-accessible information about the provider. Once the server is identified and the device 10 configured, the device 10 can directly send e-mail over the Internet without the need for an attached computer. Such a device 10 provides a smaller, more portable, and lower-cost e-mail-capable mechanism for disseminating information electronically to a wide number of recipients. When used with a dial-up modem interface, the device allows information to be disseminated from any location where access to a telephone line is available.

Figure 2:
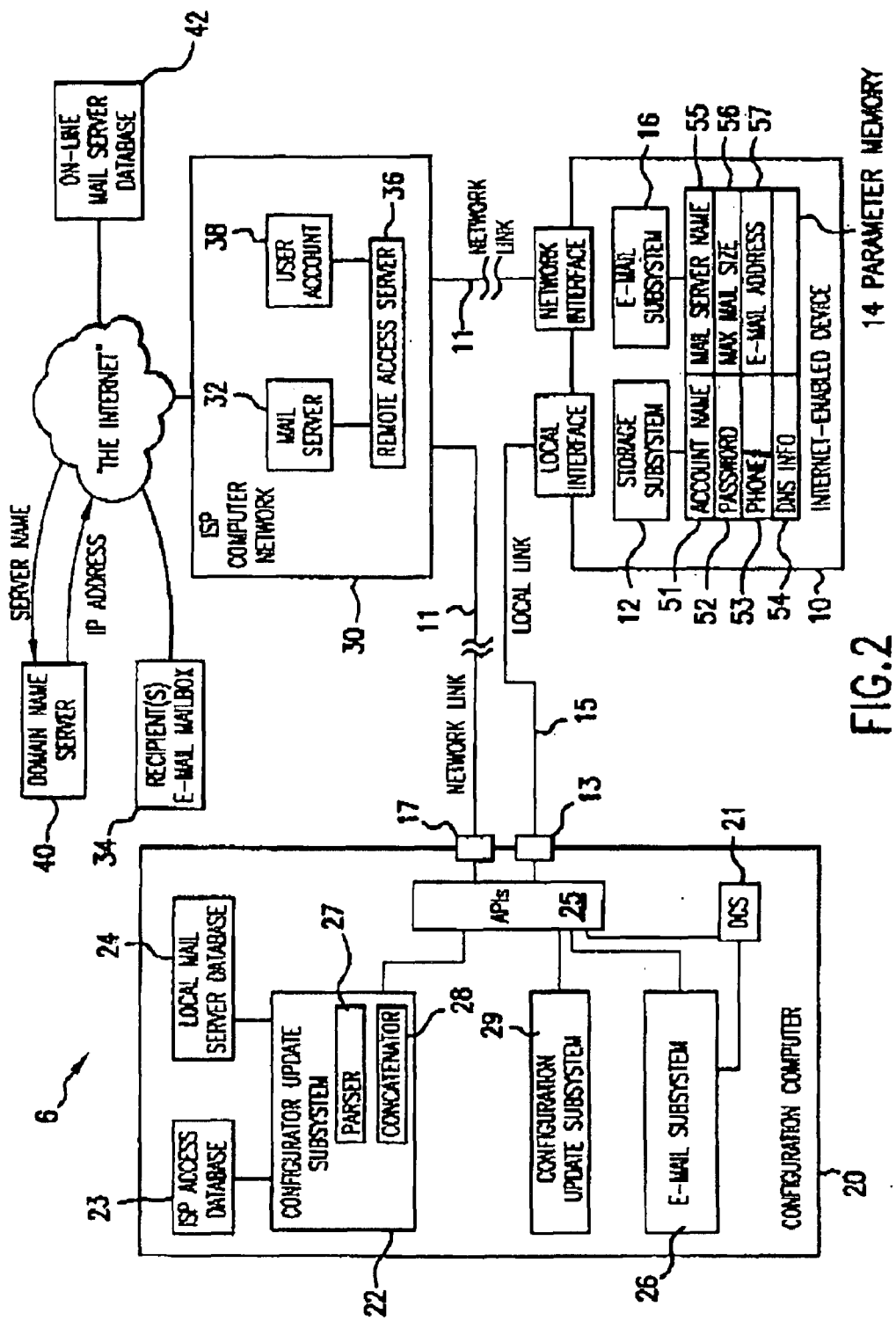
FIG. 2 is a block diagram of the system of FIG. 1.

Considering now the communication system 6 in greater detail with reference to FIGS. 1 and 2, the system 6 generally includes the Internet-enabled device 10 coupled between a configuration computer 20 and an Internet Service Provider (ISP) on computer network 30 via a local link 15 and a network link 11 respectively. The Internet-enabled device 10 is adapted for periodic connection to the configuration computer 20 and the ISP computer network 30 as will be explained hereinafter in greater detail. A storage subsystem 12 having a parameter memory 14 forms part of the Internet-enabled device 10 and responds to commands from the configuration computer 20 by storing configuration parameters in the parameter memory 14 to facilitate Internet communication by the Internet-enabled device 10 without the use of a computer such as the configuration computer 20. An e-mail subsystem 16 coupled to the parameter memory 14 responds to a user-generated request to connect to an e-mail server 32 of the ISP computer network 30 by the configuration parameters, including a mail server name, stored in the parameter memory 14. A configuror subsystem 22 of the configuration computer 20, typically implemented as a software program, determines the address of the Internet Service Provider computer network 30 in a simple manner by using the server name from the e-mail address of the user.

Figure 4:
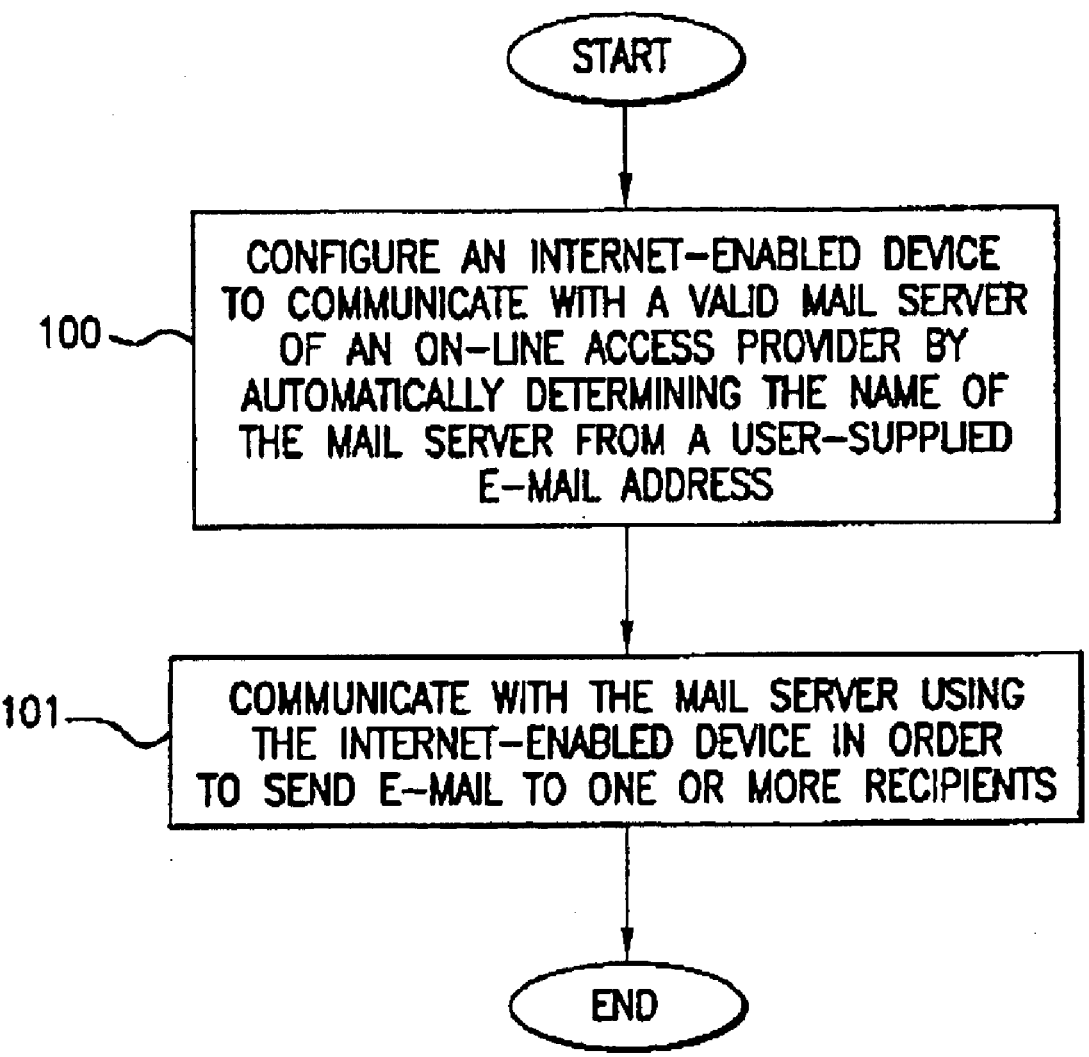
FIG. 4 is a high-level flowchart according to the present invention for communicating with an unknown mail server in order to send information by e-mail using the system of FIG. 1.

In operation in accordance with the novel communication method of the present invention, and with reference to FIG. 4, the configuration computer 20 determines at 100 whether a machine-selected one of a plurality of mail server names corresponds to a valid mail server associated with the ISP computer network 30. The plurality of mail server names are automatically determined from a user-supplied e-mail address associated with the user's account 38 on the ISP computer network 30. Once a mail server name corresponding to the mail server name of the ISP computer network 30 has been determined, the Internet-enabled device 10 communicates at 101 with the ISP computer network mail server 32.

As best understood with reference to FIGS. 1 and 2, a preferred embodiment of the system includes an Internet-enabled device 10, such as an optical scanner 10*a* or a digital camera 10*b*. The Internet-enabled device 10 is adapted for periodic connection over a network link 11 to a computer network 30 of an Internet service provider (ISP) on which a user account 38 is provided. The network 30 may be located at a considerable distance from the device 10. The device 10 has a network interface 17 of a type that is capable of supporting the various network protocols, such as TCP/IP, which are required to communicate with a remote access server 36 associated with the ISP network 30. Such interface types include, but are not limited to, a dial-up modem or a digital subscriber line (DSL) modem for connecting via an analog phone line, a cable modem for connecting via a broadband link, a network interface for connecting over a local area network (LAN), an infrared transceiver for connecting via a wireless infrared (IR) link, and a radio frequency transceiver for connecting via a wireless radio frequency (RF) link. The ISP computer network 30 typically provides a user with the ability to access the Internet, and send and receive e-mail over it. The Internet-enabled device 10 is also adapted for periodic connection via a local interface 13 over a local link 15 to a configuration computer 20, which is preferably located in relative proximity to the device 10. The computer 20 can be of any type, including but not limited to personal computers, workstations, and the like, and can utilize any operating system capable of supporting the features of the invention described herein. Types of local interfaces 13 include, but are not limited to, a parallel (Centronics) port, a serial port, and a universal serial bus (USB) port. A configuration subsystem 22 on the configuration computer 20 configures the device 10 for sending e-mail. As will be discussed subsequently in greater detail, a preferred embodiment of the configuration subsystem 22 is a software program having a set of instructions which determines, based on the user's e-mail address, the server name of an e-mail server 32 of the ISP network 30. The Internet-enabled device 10 has a parameter storage subsystem 12 which receives configuration parameters, the details of which will subsequently be described, from the configuration computer 20 and stores these parameters in a parameter memory 14. The Internet-enabled device 10 also has an e-mail subsystem 16 coupled to the parameter memory 14. As will also be discussed subsequently in further detail, in response to a user's request to send an e-mail message, the e-mail subsystem 16 uses the configuration parameters in the parameter memory 14 to connect to the e-mail server 32 of the ISP network 30 and send the requested information from the device 10 to the e-mail mailboxes 34 of the specified recipient(s).

Before discussing the system and method in further detail, it is useful to consider the types of information that some exemplary devices 10 according to the present invention are capable of generating. Photographs captured by a digital camera 10*b* are typically each stored in a compressed image file. The size of the file for each photograph is typically determined by the pixel resolution of the camera, the content of the photographed scene, and the type of compression applied to the image. An optical scanner 10*a* can generate either a compressed image file as above, or alternatively can use optical character recognition to generate a text file. The type of text files produced include, but are not limited to, plain text, or formatted text that includes characteristics such as font style, font size, and text layout. For scanners that include automatic sheet feeders, such as the scanners incorporated in some multifunction devices, the number and size of files comprising the information which can be produced from a single scanning request by the user can be quite large. As will be discussed subsequently, the e-mail subsystem 16 splits the information into one or more e-mail messages, so that no single e-mail message is larger than the maximum e-mail message size supported by the e-mail server 32.

It is also useful to consider in some additional detail the Internet service provider computer network 30. The ISP network 30 maybe comprised of a single computer or a number of computers controlled by the ISP. The physical location of these ISP computers to the configuration computer 20, the Internet-enabled device 10, and each other is generally irrelevant to the present invention. The ISP computers are, in turn, connected to non-ISP computers via the Internet. What is more relevant for the present invention are the various "services" that the ISP network 30 provides. The services are provided by subsystems known as "servers" which can be software, hardware, or a combination of both. These servers may be associated either with the. ISP network 30, or by other computers connected to the Internet and to which access is provided by the ISP network 30. Accordingly, the organization of servers as services as indicated in FIG. 2 is merely exemplary.

Figure 3:
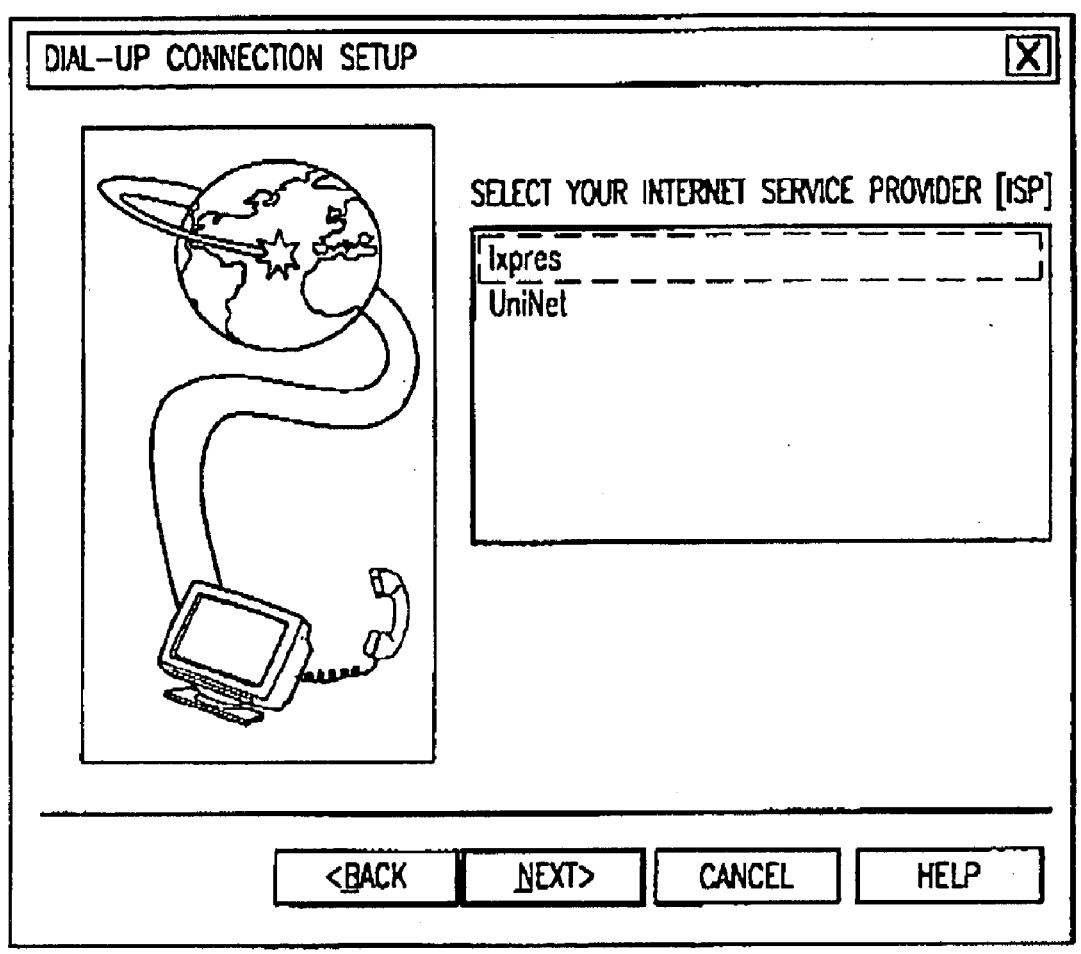
FIG. 3 is an exemplary user interface for specifying an Internet Service Provider to be used by the internet-enabled device of FIG. 1.

The novel method of the present invention includes (1) determining whether a machine-selected mail server name corresponds to a mail server associated with an on-line Internet service provider, and (2) communicating with the mail server when the mail server name does correspond. Considering first the determining of the mail server, the configuration computer 20 is connected to a user account 38 of an Internet service provider using preconfigured access parameters. If the configuration computer 20 has been set up to access more than one ISP, the user selects, as shown by example in FIG. 3, which ISP the device 10 should be configured to use. Typically these access parameters for the ISP have been determined at a prior time when the configuration computer 20 was configured for connecting to the selected ISP network 30. For an exemplary dial-up user account, where a point-to-point protocol (PPP) connection is made using a modem to connect to the telephone lines, the access parameters typically include, but are not limited to, the telephone number 53 of the ISP network 30, the user account name 51, the user password 52, and parameters 54 which describe how to access a domain name server (DNS) 40. The DNS is a service that can translate an alphanumeric Internet domain name (also known as a canonical name, for example, "mail.ixpres.com") of a computer system into the IP address (such as 15.80.70.154) that networking software requires in order to communicate with that computer system. The configuration computer 20 also determines a mail server name associated with the user account of the ISP 30. The mail server name symbolically denotes a service which can be used to send e-mail. Once the mail server name has been determined, it is stored by the configuration computer 20 to the Internet-enabled device 10 along with a selected portion of the preconfigured access parameters, so that the Internet-enabled device 10 can subsequently connect to the user account.

In the preferred embodiment, determining the mail server name to be downloaded to the device 10 for access to the mail server 32 is done by converting an e-mail address associated with the user account into a mail server name associated with the user account. The e-mail address is preferentially not included among the preconfigured access parameters but rather, as will be described in more detail subsequently, is provided by the user during the configuration process of the Internet-enabled device 10. To ensure that the mail server name is a valid one, a mail server 32 corresponding to the constructed mail server name is accessed by the configuration computer 20. Generally this is accomplished, as will be discussed subsequently in further detail with reference to FIG. 7, by querying the DNS 40 for the mail server name so as to obtain the IP address of the mail server 32, and connecting to the mail port 33 (which is port #25) of the IP address so as to verify the existence of the mail port 33. The preferred embodiment also accesses the mail server 32 corresponding to the mail server name so as to determine the maximum e-mail size supported by the server 32, and stores the maximum e-mail size to the Internet-enabled device 10. The device 10 uses the maximum e-mail size during the transmission of information to split the information into one or more e-mail messages as required in order to ensure that no single e-mail message is larger than the maximum e-mail message size supported by the e-mail server 32. In some embodiments, as a confirmatory step that the configuration of the Internet-enabled device 10 has been accomplished successfully, the device 10 connects to the user account using the preconfigured access information and to the mail server 32 using the mail server name, and sends an e-mail message, one exemplary version of which is shown in FIG. 10, to the e-mail address associated with the user account so as to allow the user to verify successful configuration of the Internet-enabled device 10.

Considering now in further detail the configuration parameters stored in the parameter memory 14, the configuration parameters preferentially include the selected portion of the preconfigured access parameters, the mail server name 55, the user's e-mail address 57, and the maximum e-mail size 56 supported by the mail server 32. The preconfigured access parameters may be specific to the type of interface 17 between the device 10 and the ISP network 30, but typically include user account access information (which in the case of a dialup account as described heretofore, for example, include the account name 51, password 52, and phone number 53), and DNS information 54 identifying the domain name server 40 associated with the user account. In some embodiments, the parameter memory 14 may also contain additional parameters which may either be related or unrelated to accessing the Internet. Such parameters may include e-mail addresses of recipients, or distribution lists containing sets of e-mail addresses.

Figure 5A:
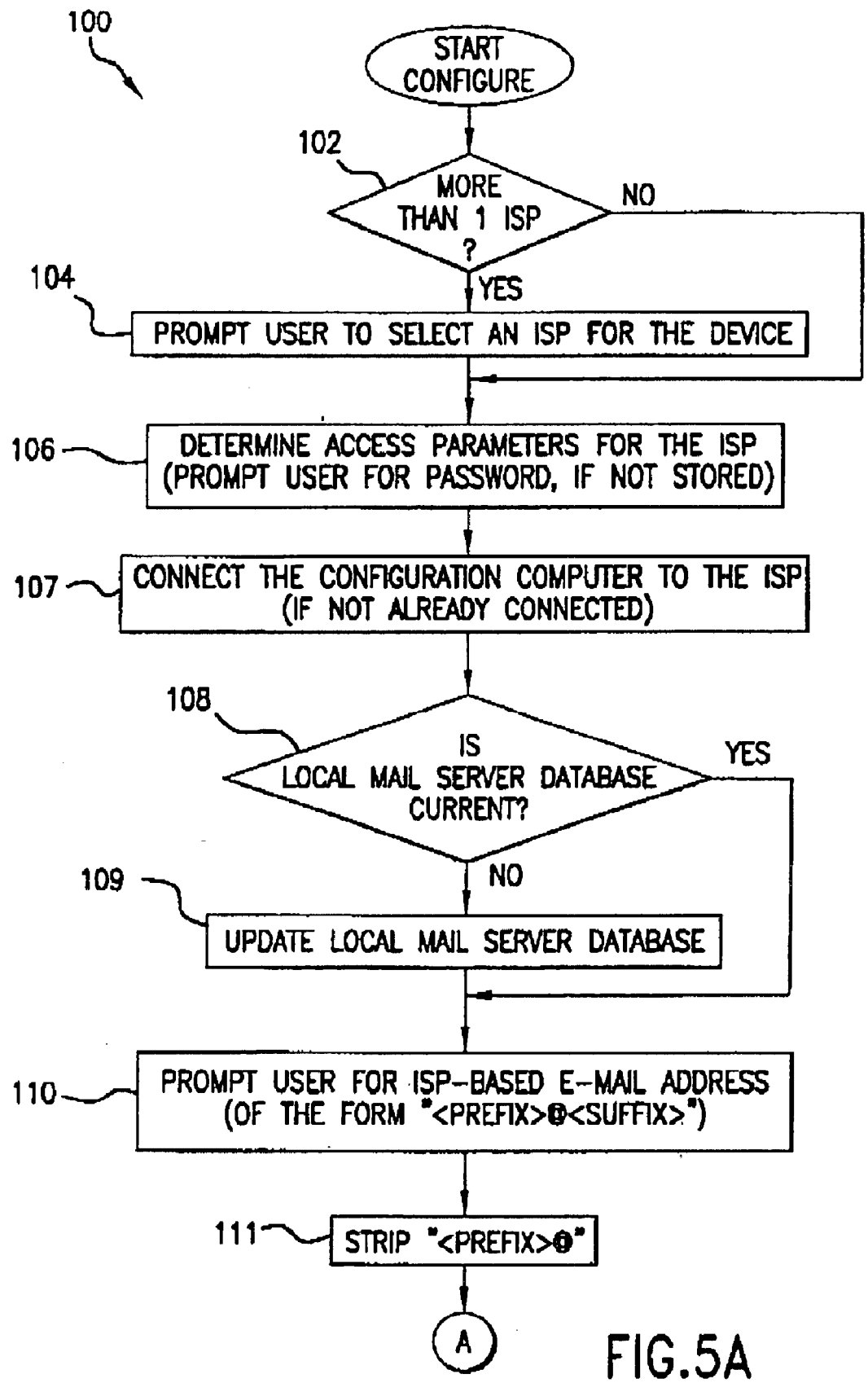
FIGS. 5A-5C are detailed flowcharts for configuring the Internet-enabled device of FIG. 1 according to FIG. 4.
Figure 5B:
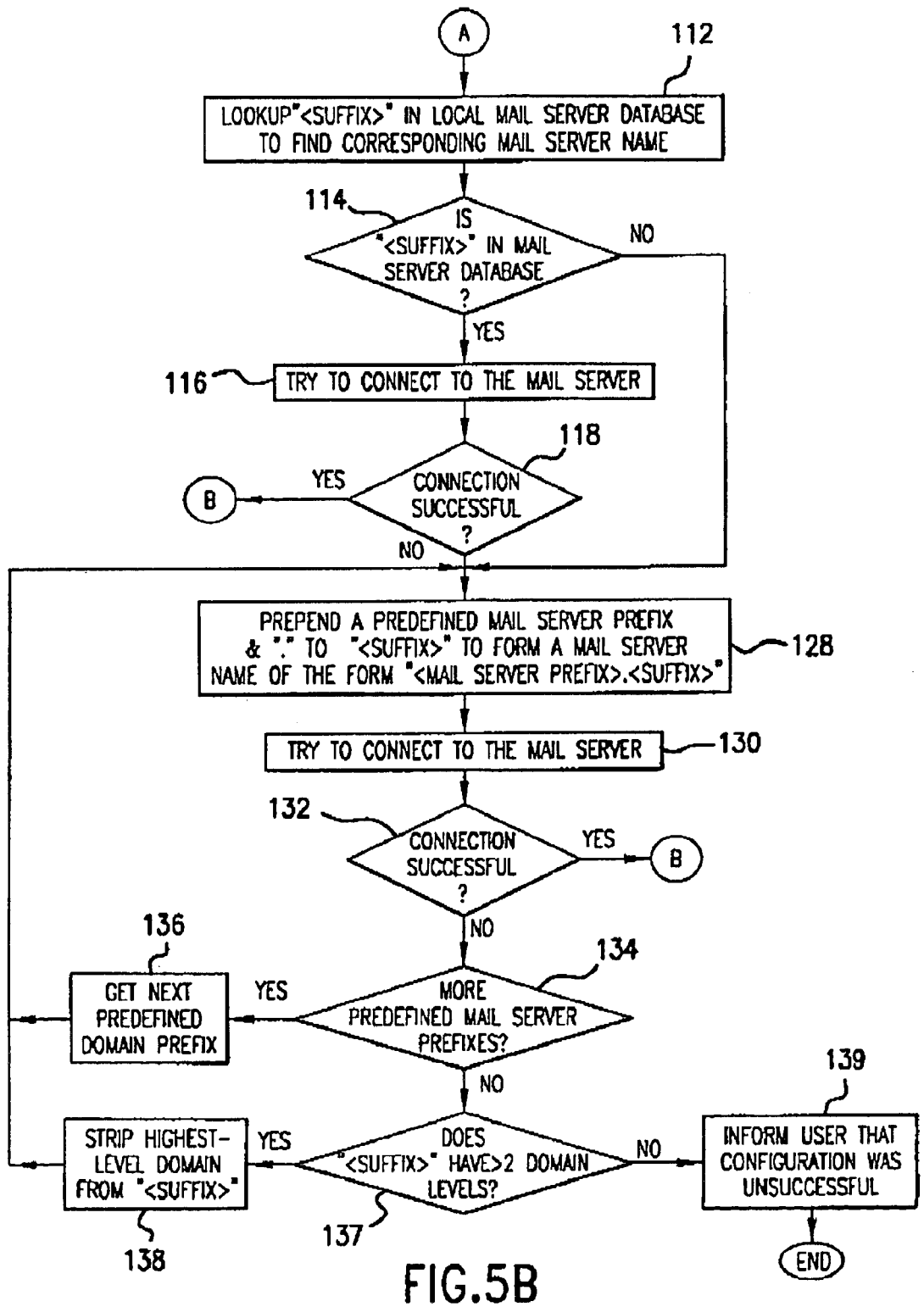
Figure 5C:
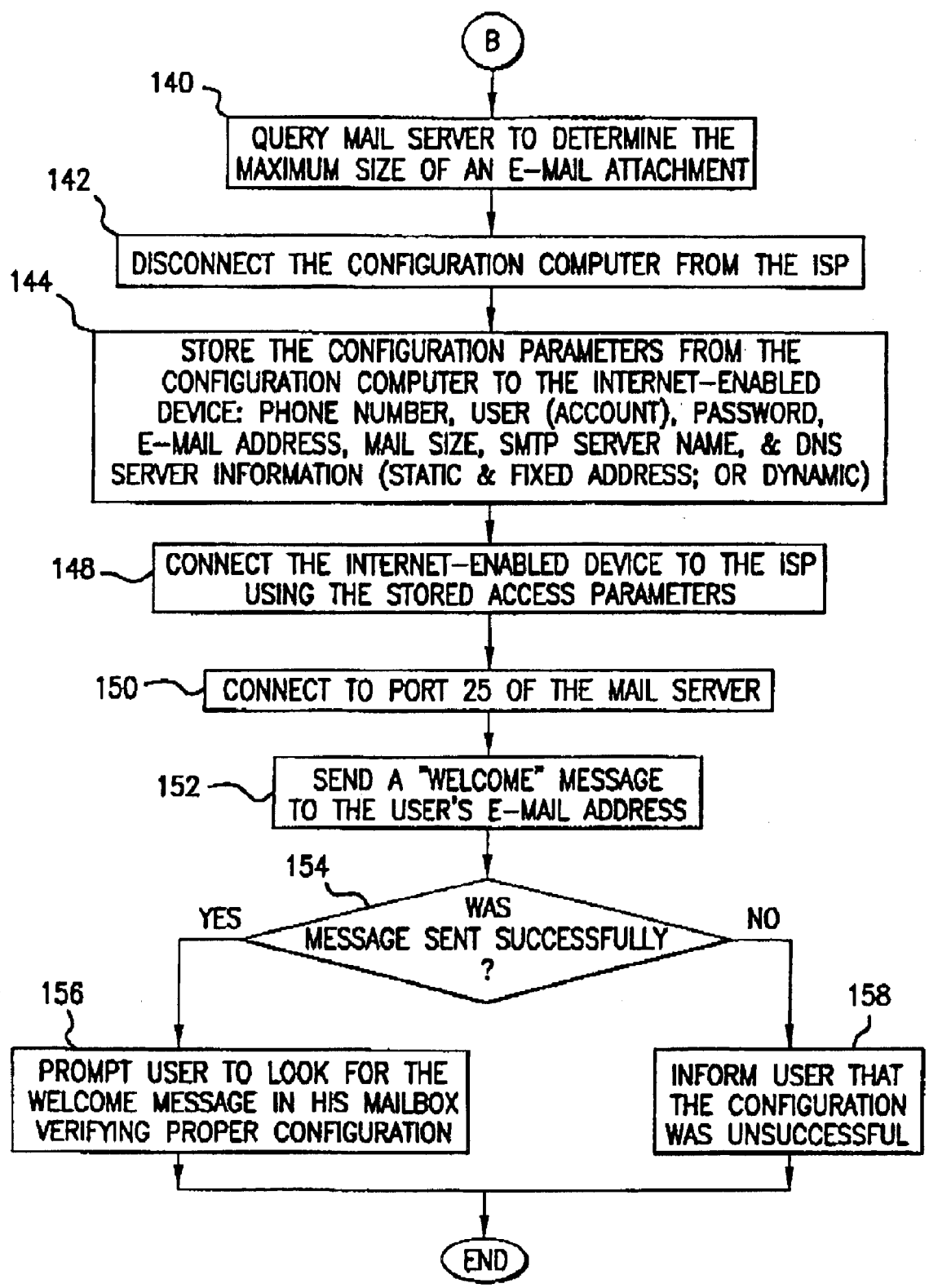

Considering now in further detail the process of configuring 100 the Internet-enabled device 10, and with reference to FIG. 2, the configuration computer 20 includes a configuror subsystem 22 which orchestrates the major portion of the configuration process. The subsystem 22 can be implemented as computer software, computer firmware, computer hardware, or a combination of these technologies. The subsystem 22 can access an ISP access database 23 containing the preconfigured access parameters for each ISP the configuration computer 20 is configured to access, and a local mail server database 24. Through an appropriate set of application programming interfaces (APIs) 25, the configuror subsystem 22 can communicate with the ISP network 30 and the device 10. With further reference to FIGS. 5A-5C, the configuror subsystem 22 determines, at 102, whether the configuration computer 20 is configured to access more than one ISP. If it is, then the user is prompted at 104 to select, as shown by example in FIG. 3, the ISP that the Internet-enabled device 10 should use for sending e-mail; if only one ISP is configured, the user will not be prompted. At 106, the configuror 22 determines the preconfigured access parameters for the ISP, which are typically stored on the computer 20. If the ISP requires a password that is not stored as part of the preconfigured access parameters, the user will be prompted to supply it. If the configuration computer 20 is not already connected to the ISP, the connection is made at 107. The point in the configuration process at which this connection is made is not critical, provided that the computer 20 is connected to the ISP at each subsequent point where access to the Internet is attempted. At 108, the configuror 22 determines whether the local mail server database 24 is current, for example by comparing the date stamp of the local database 24 with the date stamp of the on-line mail server database 42. If the local mail server 24 is not current ("No" branch of 108), then at 109 the local database 24 is updated to match the on-line database 42, typically by downloading the on-line database 42 over the Internet to the computer 20.

Figure 6:
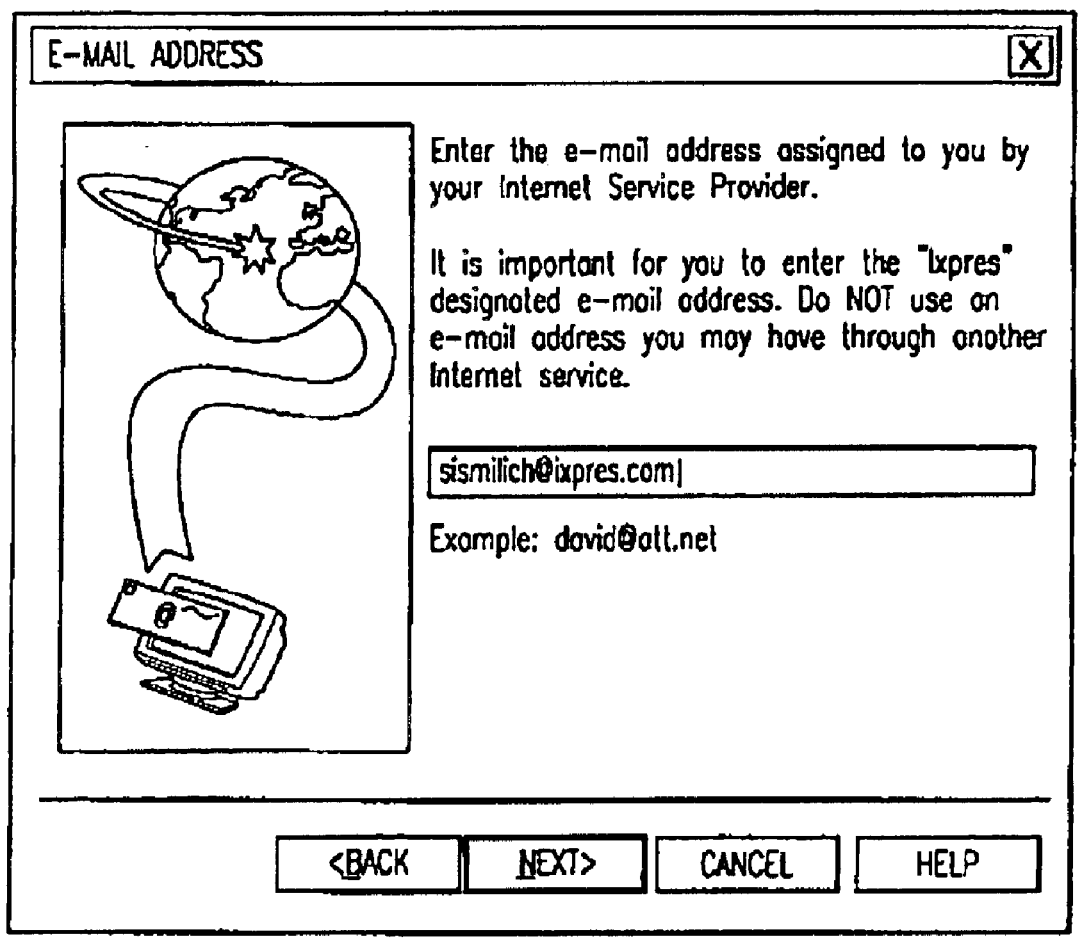
FIG. 6 is an exemplary user interface for specifying an e-mail address used to determine the mail server of the Internet service provider of FIG. 3.

At 110, the user is prompted to supply an e-mail address which will be used to determine the mail server 32. The present invention is advantageous in that the only configuration information for an ISP that a user must supply to the configuror 22 in order to set up the Internet-enabled device 10 is his e-mail address, which most users typically commit to memory. The e-mail address requested is one which represents a mailbox provided by the ISP, rather than a web-based mailbox unconnected with the ISP. For example, if the ISP is "ixpres.com", a valid e-mail address would be "sismilich@ixpres.com", as shown by example in FIG. 6; on the other hand, "sismilich@hotmail.com" would be an invalid e-mail address, because it is a web-based mailbox. In general, an e-mail address takes the form of "<mailbox identifier>@<domain identifier>". The separator "@" separates the prefix "<mailbox identifier>" from the suffix "<domain identifier>". For example, in the e-mail address "jkiosk@atlantic.net", the domain identifier is "atlantic.net" and the mailbox identifier is "jkiosk"; in the example "btc@waldonet.axt.net", the domain identifier is "waldonet.axt.net" and the mailbox identifier is "btc". The domain identifier typically contains two or more domain levels, with each domain level separated from each other by a period ("."). By convention, domain levels are identified from right to left. For example, for the domain identifier "waldonet.axt.net", "net" is the top-level domain, "axt" is the second-level domain, and "waldonet" is the third-level domain.

At 111, a parser 27 in the configuror 22 strips the prefix and the separator "@" from the e-mail address to isolate the suffix. At 112, the local mail server database 24 is searched for the suffix. For each suffix that exists in the database, there is a corresponding mail server name that will be returned if the search is successful. If the search is unsuccessful and the suffix is not in the database, the configuror 22 branches to 128. If the suffix is found in the database, then at 116, and as will subsequently be described in detail with reference to FIG. 7, the configuror 22 tries to connect to the mail server 32 corresponding to the mail server name in order to determine whether the mail server name is a valid one. If the connection at 116 is successful, the program branches from 118 to 140 for further communication with the mail server 32 as will be described subsequently.

If the connection at 116 is not successful, or if the suffix was not found in the local database 24 at 114, then at 128 a concatenator 28 of the configuror 22 converts the e-mail address to a mail server name by prepending one of a predefined set of mail server prefixes and a period (".") to the suffix to form a mail server name of the form "<mail server prefix>.<suffix>". A relatively large number of ISPs use one of a relatively small number of mail server prefixes to name their mail servers 32. The most commonly used prefixes include: smtp, mail, mailhost, out, isp-mail, web, imail, ms1, smtprelay, damail, smtp01do, intramail, smtp-1, smtp-2, email, and mbox. At 130, the configuror 22 tries to connect to a mail server 32 having the constructed mail server name. If the connection at 130 is successful, the program branches from 132 to 140 for further communication with the mail server 32. If the connection is not successful, and if there are more predefined mail server prefixes that have not yet been used to form a constructed server name, the next prefix is obtained at 136 and the configuror 22 branches to 128 to form a constructed server name using the next prefix. If there are no more untried mail server prefixes at 134, then the number of domain levels in the suffix is examined at 137. If the suffix has more than two domain levels, then the highest-numbered (left-most) domain level is stripped from the suffix, and the method branches to 128 to use the shortened suffix in forming mail server names. For example, if prepending mail server prefixes to the domain identifier "waldonet.axt.net" was unsuccessful, the domain level "waldonet" will be stripped from the suffix, and mail server prefixes will be prepended to "axt.net" in an attempt to identify the mail server. If the current version of the suffix has two or fewer domains ("No" branch of 137), then the configuration has been unsuccessful, and the user is so informed at 139 before the configuror 22 terminates. In an alternative implementation, instead of terminating, the configuror 22 could prompt the user to supply the correct mail server name, and then continue by branching to 140 upon receipt of the server name.

Figure 7:
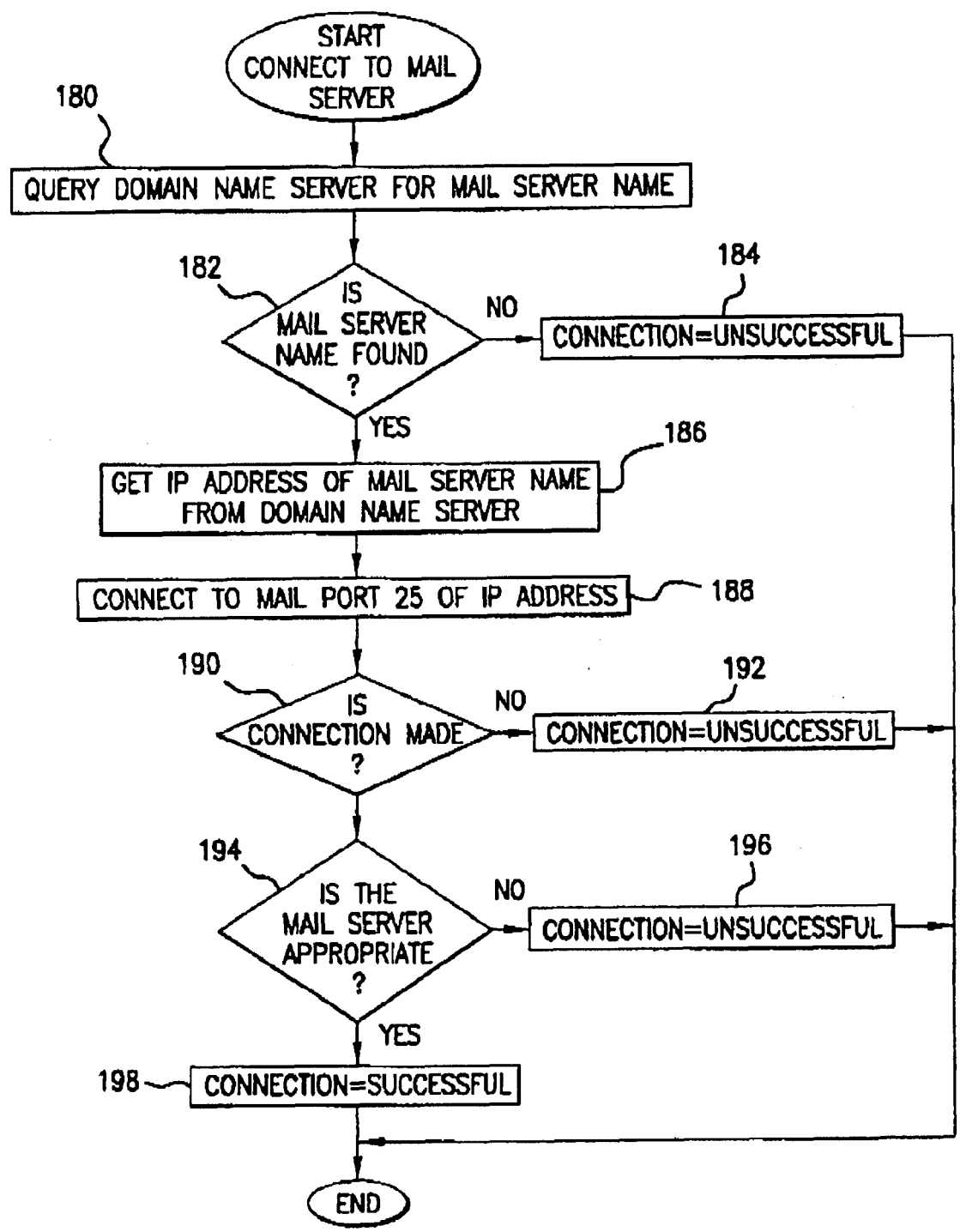
FIG. 7 is a detailed flowchart for connecting to the mail server of FIGS. 5A-5C.

Considering now in further detail the method of trying to connect to the mail server as is performed at 116 and 130 of FIG. 5B, and with reference to FIG. 7, at 180 the configuror 22 queries the domain name server 40 to determine whether the server 40 recognizes the mail server name as identifying a mail server. If the mail server name is not found by the server 40 during a search of its database ("No" branch of 182), then the connection to the mail server is flagged as unsuccessful at 184. If the mail server name is found ("Yes" branch of 182), then at 186 the configuror 22 obtains from the domain name server 40 the Internet protocol (IP) address of the mail server which corresponds to the mail server name. At 188, the configuror 22 tries to connect to port 25 of the IP address. If connection is not made ("No" branch of 190), then the connection 14 to the mail server is flagged as unsuccessful at 192. If connection is made ("Yes" branch of 190), then at 194 the configuror 22 communicates with the mail server 32 in order to determine whether the mail server 32 is an appropriate one for sending e-mail from the Internet-enabled device 10. If the mail server is not appropriate ("No" branch of 194), then the connection to the mail server is flagged as unsuccessful at 196. If the mail server is appropriate for the device 10 to use ("Yes" branch of 194), then the connection to the mail server is flagged as successful at 198.

Considering now the actions performed by the configuror 22 upon successfully connecting to the mail server, and again with reference to FIG. 5C, at 140 the maximum size of an e-mail message supported by the mail server 32 is obtained. Preferably this is performed by querying the mail server 32 using the appropriate simple mail transport protocol (SMTP) commands. SMTP is defined by RFC 821 of the Internet Engineering Task Force (available on the Internet at http://www.ietf.org/), and which is well known to those skilled in the art. At 142 the configuration computer 20 is disconnected from the ISP; this can be done at any point after the e-mail message size is obtained. At 144, a heretofore described selected portion of the predetermined access parameters, the mail server name, and the user's e-mail address are sent by the configuror 22 to the Internet-enabled device 10, which in turn stores them in its parameter memory 14. At 148, the Internet-enabled device 10 connects to the ISP using the stored access parameters. At 150, the device 10 connects to the mail server 32 using the stored mail server name and the DNS access parameters. After the connection to the mail server 32 is established, at 152 the device 10 issues the appropriate SMTP commands to the mail server 32 in order send an e-mail message, such as the message shown in FIG. 10, to the user's e-mail address to inform him that the device 10 has been configured. If the communication between the device 10 and the mail server 32 indicates that the e-mail message was sent successfully ("Yes" branch of 154), then the configuror 22 is so informed, and at 156 prompts the user to subsequently look for an e-mail message in his mailbox verifying proper configuration. If the e-mail message was not sent successfully ("No" branch of 154), then the configuror 22 is so informed and at 158 informs the user of the lack of success. After 154, the device 10 can disconnect from the ISP.

Figure 8A:
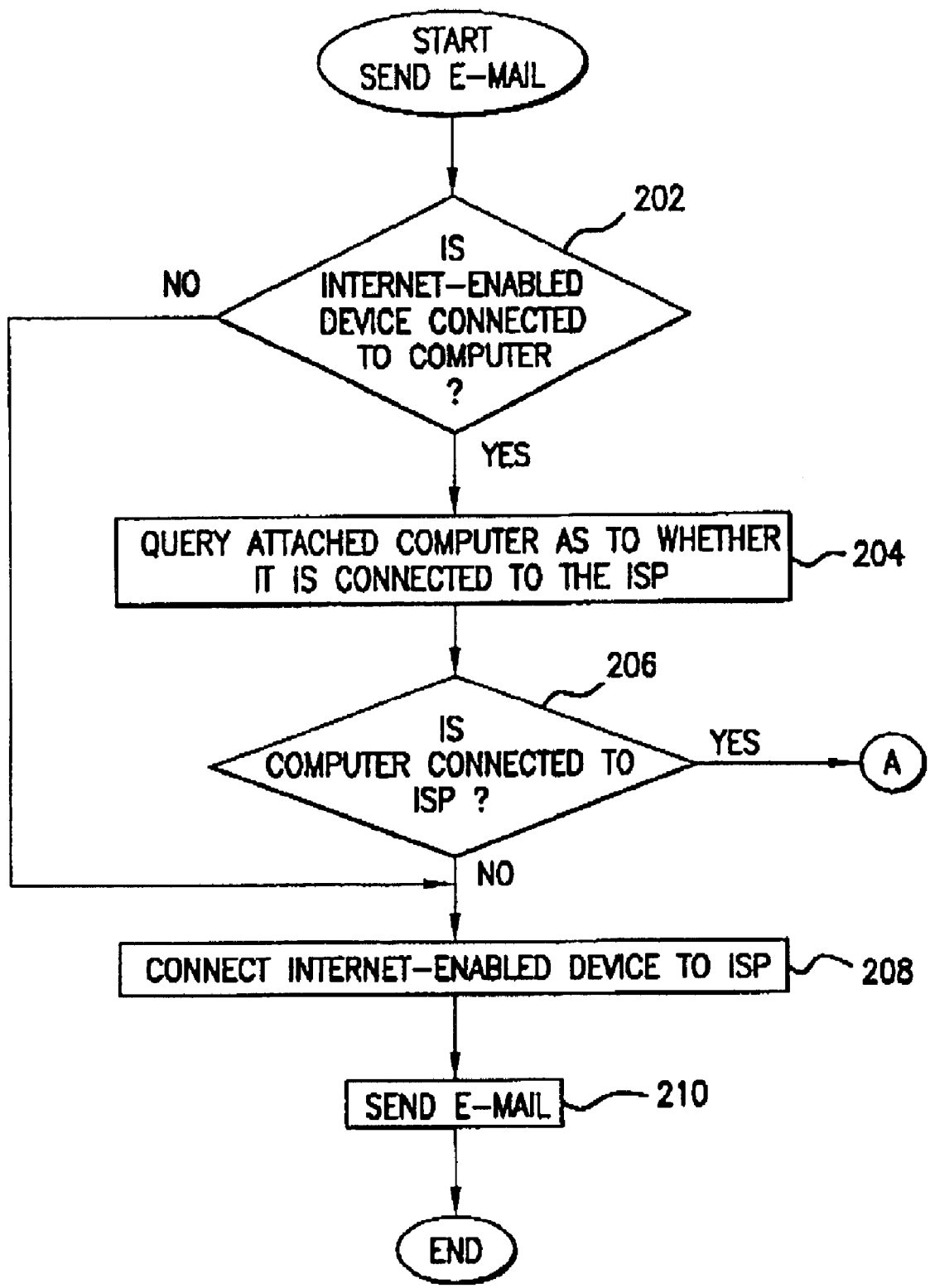
FIGS. 8A-8B are flowcharts for sending e-mail from the device of FIG. 1.
Figure 8B:
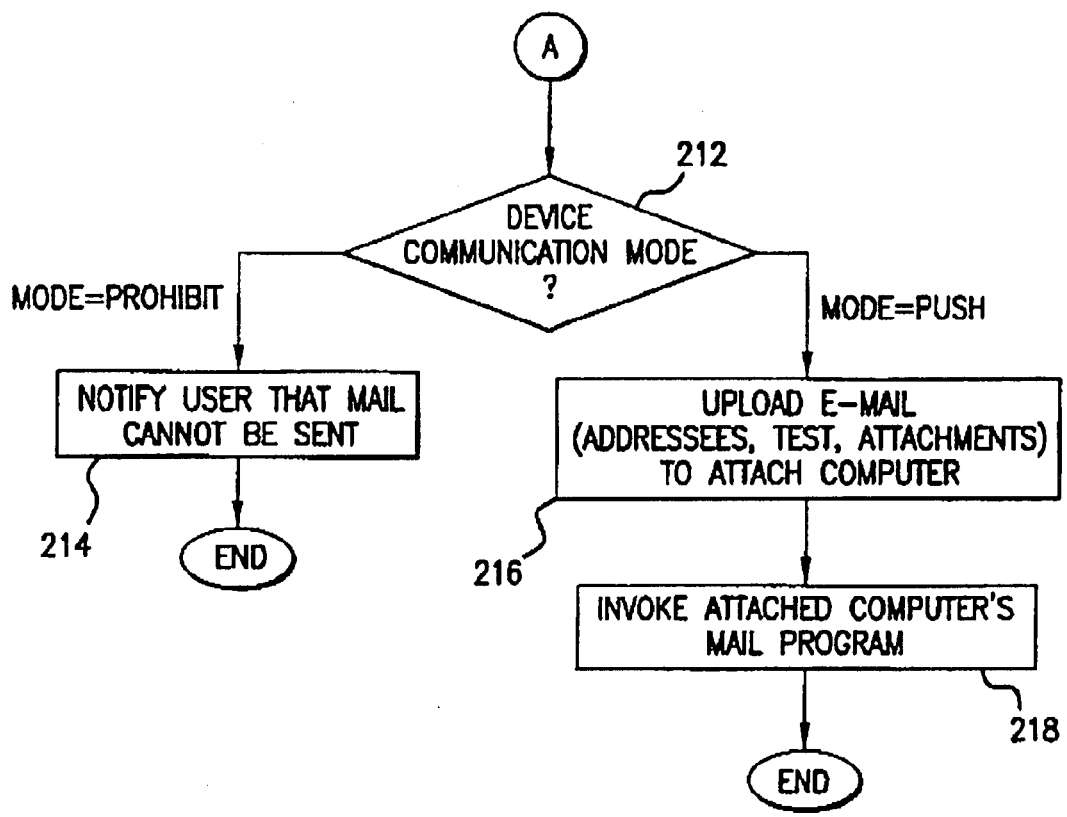

Considering now the communicating with the mail server when the mail server name does correspond to a mail server associated with an on-line Internet service provider, and with reference to FIGS. 8A-8B, the Internet-enabled device 10, after it has been configured as heretofore described, can generate information by scanning, photography, or other methods, connect to the ISP, and send this information by e-mail to one or more recipients. Particularly in the case of dial-up ISPs, the ISP usually prohibits more than one connection to the same user account at the same time. Since the device 10 has been configured to use the same user account as that of the configuration computer 20, it is possible that two such connections to the same user account could be attempted. Therefore, in some embodiments of the present invention the device 10 interoperates with a computer to which it is connected after configuration in order to prevent such an access conflict from occurring. The computer may, but does not need to be, the configuration computer 20. Upon receiving a request to send e-mail, such as when the user presses an e-mail key on the device 10, the e-mail subsystem 16 of the device 10 determines, at 202, if the device 10 is connected to a computer. If so, at 204 the device 10 queries the attached computer to determine whether or not the computer is presently on-line to the ISP. In order for the computer to respond to queries from the device 10 sent to the interface 13, the computer may include a device communication subsystem (DCS) 21 to detect and respond to these requests. If either the device 10 is not connected to a computer ("No" branch of 202), or if the device 10 is attached to the computer but the computer is not on-line to the ISP ("No" branch of 206), then the device 10 will connect to the ISP at 208, and send the requested e-mail message at 210. If the device 10 is attached to the computer and the computer is presently on-line to the ISP, a communication mode of the device 10 is determined at 212. If the mode is such that sending e-mail is prohibited under these condition, the user will be notified at 214 that his e-mail cannot be sent. If the mode is such that the e-mail should be sent by the attached computer under these conditions, then the e-mail is uploaded to the computer at 216, and the computer's e-mail subsystem 26 is invoked to send the e-mail at 218.

Figure 9:
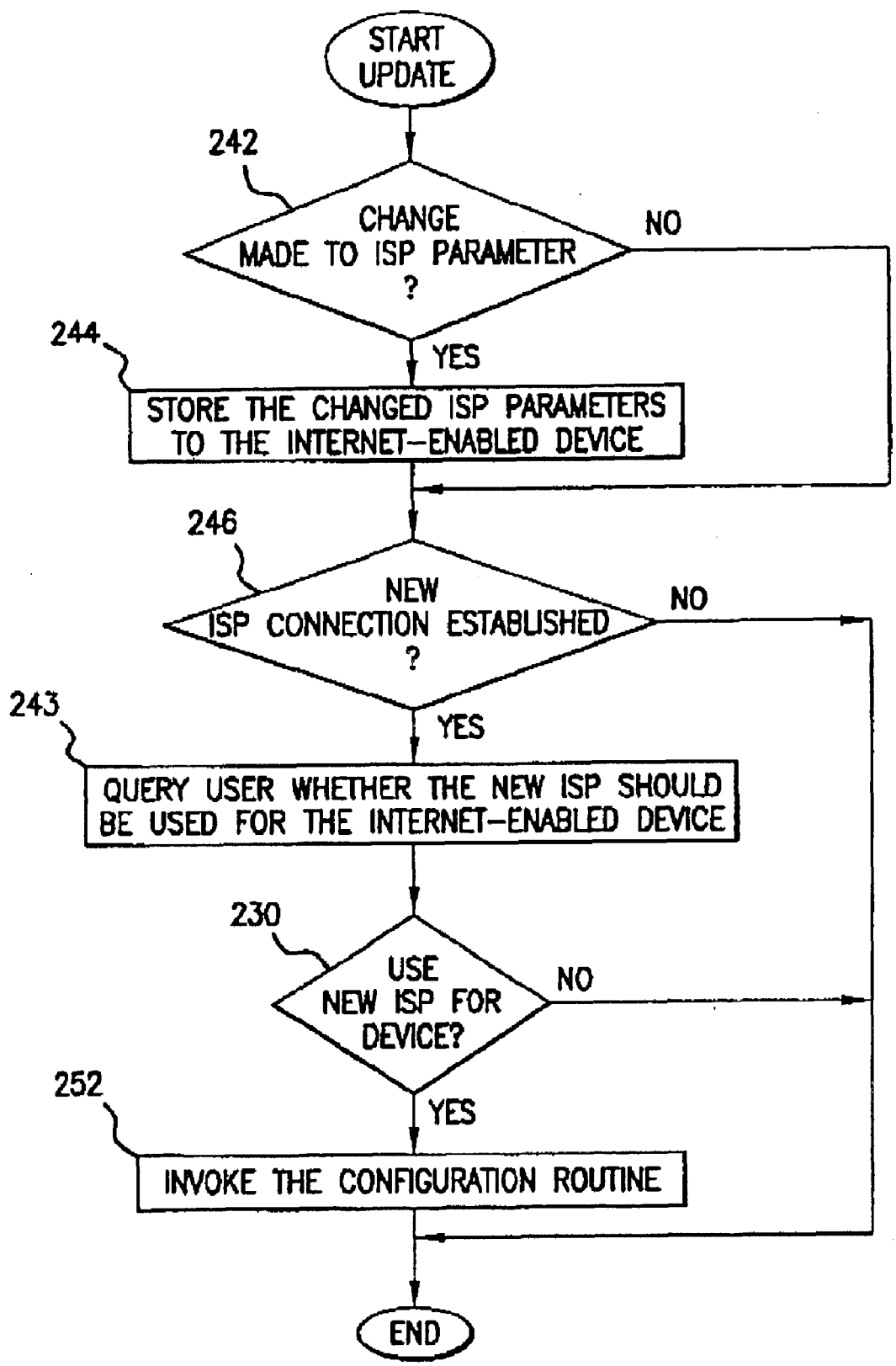
FIG. 9 is a flowchart for updating the configuration of an Internet-enabled device that has previously been configured according to FIGS. 5A-5C.

Considering now the situation in which the configuration computer 20 remains attached or is periodically attached to the Internet-enabled device 10 after its configuration, and with reference to FIG. 9, an update subsystem 29 can reconfigure the device 10 to track changes in access parameters made on the computer 20. The update subsystem can be activated either manually by the user, or automatically by the computer 20 if it detects that a device 10 is attached. If a change to the access parameters for the ISP which the device 10 uses to send e-mail is detected at 242, then the changed access parameters are stored to the device 10. For example, the user may have changed his password, or a dial-up ISP may have established a different access number. If the establishment of a new ISP on the computer 20 is detected at 246, then the user is queried at 248 as to whether the new ISP should also be used by the device 10 when sending e-mail. If so, the configuror 22 is invoked at 252.

Considering now a preferred embodiment of the configuror subsystem 22, the subsystem 22 can be embodied as a software program of instructions for configuring an electronic device to by send e-mail via a mail server of an Internet service provider. The software program is stored on a program storage medium 8 executable by the configuration computer 22. Program storage media 8 usable with the invention include but are not limited to hard disks, floppy disks, zip disks, CD-ROMs, and non-volatile memory devices. Different segments of the instructions convert the e-mail address for a user of the on-line access provider to a mail server name, connect to the mail server to verify validity of the mail server name, and store the mail server name and other access information to the device 10 as heretofore described. Also storeable on the same or different program storage media 8 are other segments of instructions for the update subsystem 29, one of which detects a change in the access information and reconfigures the device 10 as required, and another of which receives data representing information to be sent to a specified recipient from the device 10. Yet another segment of instructions storeable on the same or different program storage media 8 is a segment for the e-mail subsystem 26 which receives e-mail messages from the device 10 for forwarding, connects to the mail server 32, and transmits the information to the specified recipient as an e-mail message.

From the foregoing it will be appreciated that the novel system and method for determining an unknown mail server and configuring an Internet-enabled device to communicate with it so as to directly e-mail information represent a significant advance in the art. Although several specific embodiments of the invention have been described and illustrated, the invention is not limited to the specific methods, forms, or arrangements of parts so described and illustrated. In particular, while some of the ISP access parameters needed by the Internet-enabled device have been heretofore described as being established automatically, it may be advantageous in some situations to specify some of them manually; for example, the dial-up access phone number, where the device will be used in a different location. An alternative implementation of the configuror subsystem can allow any or all access parameters to be entered by the user, or controls for doing so can be located on the device. The present invention also has application in other types of systems which collect information electronically beyond those described heretofore; for example, in data acquisition systems and automated electronic test equipment. The invention is limited only by the claims.

What is claimed is:

1. A method of communicating with mail server associated with an on-line provider, comprising:

providing an e-mail address for the on-line provider, the e-mail address including a suffix indicative of a domain identifier;

converting the e-mail address to a machine-selected mail server name by prepending a selected one of a predetermined set of mail server prefixes to the suffix to form the machine-selected mail server name;

linking to a mail port of a computer having the machine-selected mail server name so as to determine whether the machine-selected mail server name corresponds to the mail server; and communicating with the mail server when the machine-selected mail server name corresponds to the mail server.

2. The method of claim 1, wherein the e-mail address includes a first prefix portion and a first separator portion, and wherein the converting includes stripping the first prefix portion and the first separator portion from the e-mail address, and appending a second separator different from the first separator to the selected one of a predetermined set of mail server prefixes so as to form the mail server name associated with the on-line provider.

3. The method of claim 2, wherein:

the suffix is a domain identifier, the first prefix is a mailbox identifier, the first separator is an "@" symbol, the second prefix is a mail server prefix, and the second separator is a "." symbol.

4. The method of claim 1, further including:

if validity of the mail server name is not verified, repeating the prepending and linking using a different one of the predetermined set of mail server prefixes.

5. The method of claim 1, wherein the linking includes:

communicating with a domain name server to determine a mail server IP address corresponding to the mail server name; and connecting to the mail port of the mail server IP address.

6. The method of claim 1, wherein the on-line provider is a user-selected one of a plurality of on-line providers.

7. The method of claim 1, wherein the communicating with the mail server includes:

establishing at least one communications link from a group of communication links including an analog telephone line, a broadband link, a local area network, a radio frequency link, and an infrared link.

8. The method of claim 1, wherein the suffix includes at least two domain levels and a separator between each of the at least two domain levels, and wherein the converting further includes stripping a left-most domain level and a left-most separator from the suffix prior to the prepending if the suffix includes more than two domain levels.

9. A system for e-mailing information to a recipient over the Internet, comprising:

an electronic device adapted for periodic connection to an Internet service provider and to a configuration computer, the electronic device having a parameter memory, a storage subsystem coupled to the parameter memory and responsive to a command from the configuration computer for storing configuration parameters in the parameter memory, the configuration parameters including a mail server name associated with the Internet service provider, and an e-mail subsystem coupled to the parameter memory and responsive to a user request to connect to an e-mail server of the Internet service provider using the mail server name and to e-mail the information to the recipient; and a configuration program executable by the configuration computer to determine the mail server name, the configuration program including a parser to isolate a suffix indicative of a domain identifier from an e-mail address associated with the e-mail server, and a concatenator to prepend one of a predefined set of mail server prefixes to the suffix to form the mail server name.

10. The system of claim 9, wherein the electronic device has an interface selected from the group consisting of a dialup modem, a digital subscriber line modem, a cable modem, a network interface, an infrared transceiver, and a radio frequency transceiver, the interface adapted to connect the device to the Internet service provider.

11. The system of claim 9, wherein the configuration program further determines a maximum e-mail message size supported by the e-mail servers.

12. The system of claim 11, wherein the e-mail subsystem further splits the information into one or more e-mail messages, each e-mail message having a size of not more than the maximum e-mail message size.

13. The system of claim 9, herein the electronic device is a scanner.

14. The system of claim 9, wherein the electronic device is a multifunction peripheral including at least two devices selected from the group consisting of a printer, a scanner, a copier, and a fax machine.

15. The system of claim 9, wherein the Internet-enabled device is a digital camera.

16. The system of claim 9, wherein the configuration program is further configured to query a domain name server so as to obtain an IP address associated with the mail server name.

17. A program storage medium readable by a computing apparatus, tangibly embodying a program of instructions executable by the computing apparatus for configuring an electronic device to send e-mail via a mil server of an on-line access provider, the program storage medium comprising:

a first segment of the instructions configured to convert an e-mail address for a user of the on-line access provider to a mail server name by prepending a selected one of a predetermined set of mail server prefixes to a suffix portion of the e-mail address to form the mail server name;

a second segment of the instructions configured to connect to the mail server using the mail server name so as to verify validity of the mail server name; and a third segment of the instructions configured to download the mail server name to the electronic device.

18. The program storage medium of claim 17, further comprising:

a fourth segment of the instructions configured to detect a change in access information for the on-line access provider, and reconfigure the electronic device as required based on the change.

19. The program storage medium of claim 17, further comprising:

a fifth segment of the instructions configured to receive data representing information to be sent to a specified recipient from the electronic device, connect to the mail server, and using the mail server, transmit the information to the specified recipient as an e-mail message.

* * * * *